(12) United States Patent
Narita et al.

(10) Patent No.: US 6,371,552 B1
(45) Date of Patent: Apr. 16, 2002

(54) SEAT PRESSURE SENSOR UNIT

(75) Inventors: Masanori Narita, Kanagawa-ken; Kouichi Shibuya, Tokyo, both of (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/572,501

(22) Filed: May 18, 2000

(30) Foreign Application Priority Data

May 18, 1999 (JP) ............................................. 11-137397

(51) Int. Cl.[7] .............................. A47C 7/72; A47C 31/00
(52) U.S. Cl. ................................ 297/180.12; 297/180.1; 297/217.3; 340/667; 340/425.5; 340/562
(58) Field of Search ......................... 297/180.12, 180.1, 297/217.3; 340/667, 425.5, 562

(56) References Cited

FOREIGN PATENT DOCUMENTS

| JP | 2-52608 | 2/1990 |
|---|---|---|
| JP | 3-47206 | 2/1991 |

*Primary Examiner*—Carl D. Friedman
*Assistant Examiner*—Dennis L. Dorsey
(74) *Attorney, Agent, or Firm*—McDermott, Will & Emery

(57) ABSTRACT

A seat pressure sensor unit of the present invention is provided at a portion receiving a pressure of a seat. The sensor unit comprises a sensor provided on a top face of a base cloth and a heater wire provided on the top face of the base cloth not so as to overlap the sensor.

13 Claims, 6 Drawing Sheets

SEAT PRESSURE SENSOR UNIT

BACKGROUND OF THE INVENTION

The present invention relates to a seat pressure sensor unit and more particularly to a seat pressure sensor unit which can be used preferably in a vehicle seat.

Japanese Patent Application Laid-Open Publication No. 3-47206 discloses a pressure sensor unit provided on a seat face or backrest face of a vehicle seat for detecting a physical constitution of a driver or passenger so as to adjust hardness and surface configuration thereof and also adjust an output of an airbag apparatus, optimally.

Japanese Patent Application Laid-Open Publication No. 2-52608 discloses to provide a heater wiring on a seat face or backrest face of a vehicle seat so as to provide a driver or passenger with warm environment.

SUMMARY OF THE INVENTION

However, when both the pressure sensor unit and heater wire are provided on the seat face or backrest face of the seat, both of them are overlaid while a heat insulator is imposed between the pressure sensor unit and heater wire, considering an influence of heat from the heater wire upon the pressure sensor unit.

Thus, when the pressure sensor unit is placed above the heater wire, a warm-up effect of the heater wire is reduced. On the other hand, when the heater wire is placed above the pressure sensor, the sensitivity of the pressure sensor unit is reduced.

Accordingly, an object of the present invention is to provide a seat pressure sensor unit capable of exerting both functions of the pressure sensor unit and heater wire sufficiently, even if they are provided closely in the same seat ressure sensor unit.

To achieve the above object, according to an aspect of the present invention, there is provided a seat pressure sensor unit provided at a portion receiving a pressure of a seat, comprising a sensor provided on a top face of a base cloth, and a heater wire provided on the top face of the base cloth not so as to overlap the sensor.

In other words, according to another aspect of the present invention, there is provided a seat pressure sensor unit provided at a portion receiving a pressure of a seat, comprising a pressure detecting means provided on a top face of a base cloth, and a linear heating means provided on the top face of the base cloth not so as to overlap the pressure detecting means.

DETAILED DESCRIPTION OF THE PREFERRED EMBODIMENTS

Hereinafter, the preferred embodiments of the seat pressure sensor unit of the present invention will be described in detail using an example in which it is applied to a vehicle front seat, with reference to the accompanying drawings.

First, a first embodiment of the present invention will be described in detail with reference to FIGS. 1 to 5.

Meanwhile, a direction X in the Figures indicates the forward direction in the longitudinal direction of a vehicle, direction Y indicates the leftward direction in the width direction thereof and direction Z indicates the upward direction in the vertical direction thereof.

Figure 1:
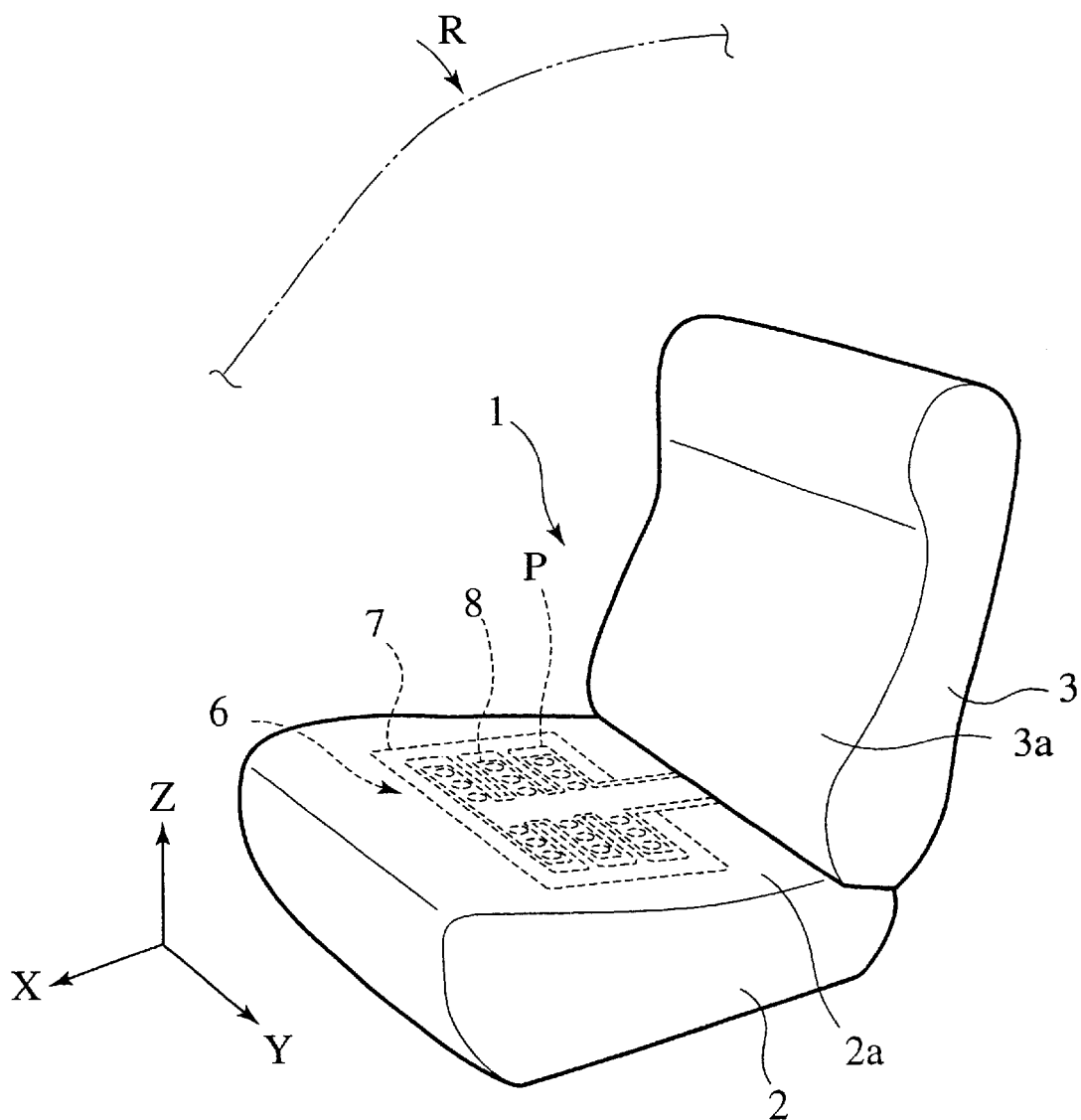
FIG. 1 is a perspective view of a vehicle seat provided with a seat pressure sensor unit according to a first embodiment of the present invention.

As shown in FIG. 1, a vehicle front seat 1 is typically mounted in a vehicle cabin R such that the forward direction, leftward direction in its width direction and upward direction in its vertical direction substantially coincide with X, Y and Z directions respectively. The seat 1 comprises a seat cushion 2 and a seat back 3.

Because a mounting structure for the pressure sensor 6 of a surface of a seat face 2a of a seat cushion 2 on which a passenger takes is the same as the mounting structure therefor of a surface of a backrest 3a on which a passenger's back rests of a seat back 3, this structure will be described in detail with reference to the surface of the seat face 2a of the seat cushion 2.

Figure 2:
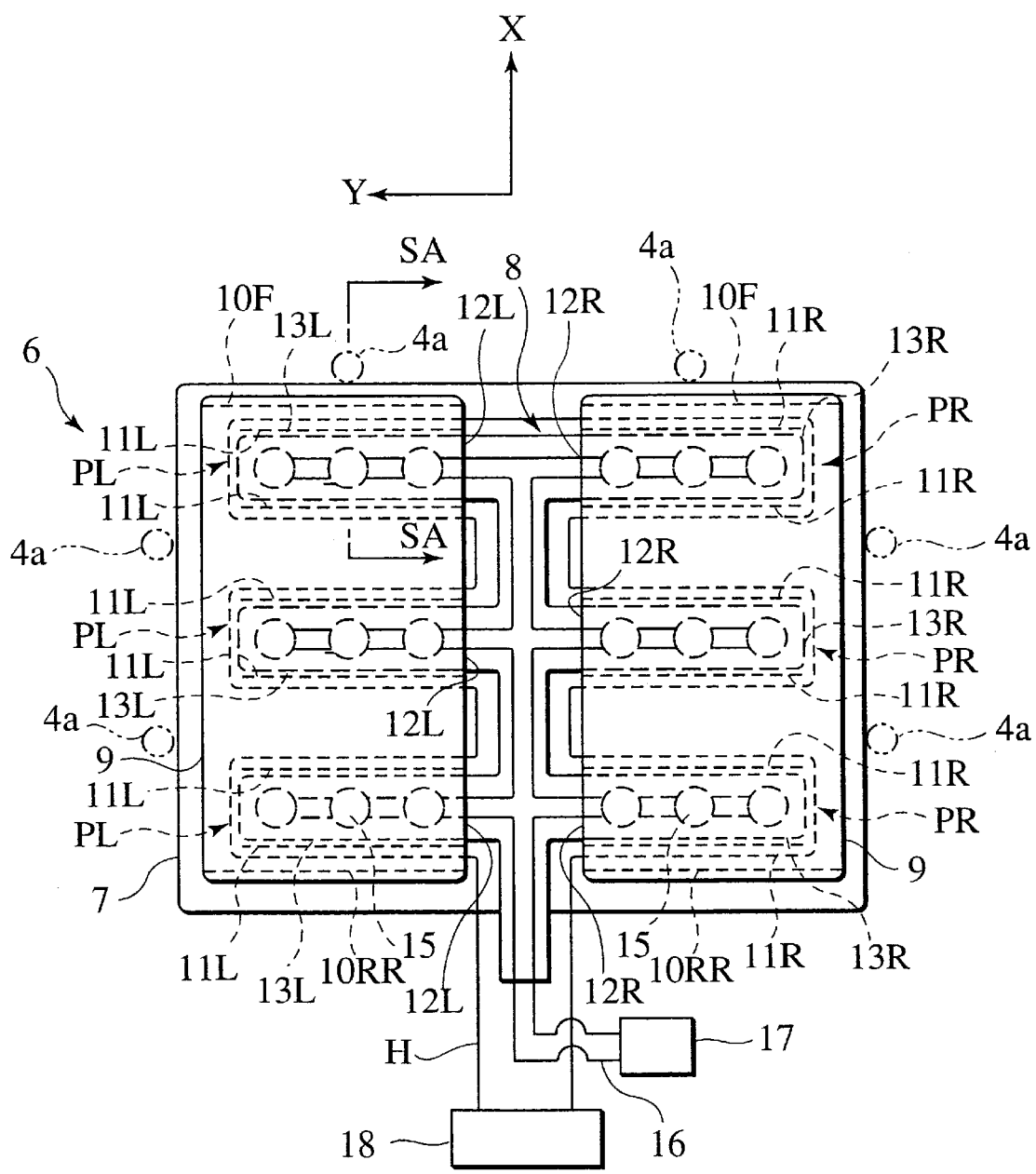
FIG. 2 is a plan view showing the seat pressure sensor unit according to the embodiment.
Figure 3:
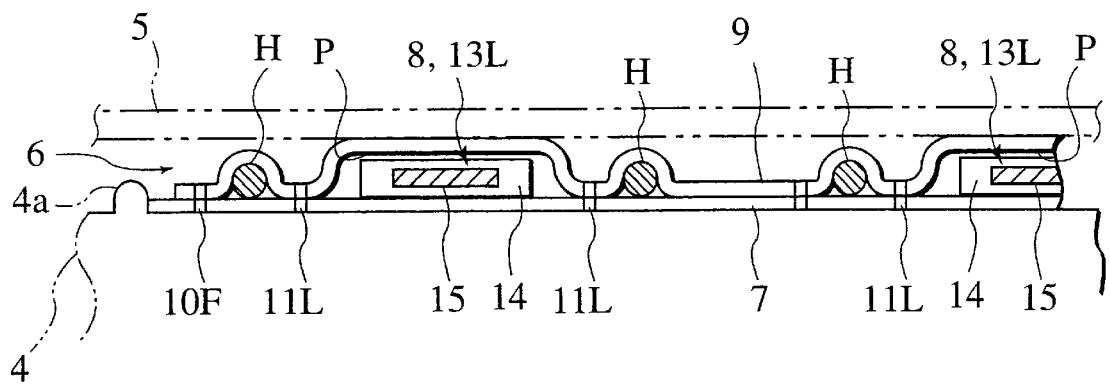
FIG. 3 is a sectional view taken along the line SA—SA of FIG. 2.

As shown in FIG. 2 and sectional view taken along the line SA—SA of FIG. 3, the surface portion of the seat face 2a comprises a urethane pad 4 for ensuring an excellent cushion performance provided on the bottom thereof and a trim 5 acting as a cover for covering the surface of the seat face 2a provided above the urethane pad 4.

The pressure sensor unit 6 is disposed between the urethane pad 4 and trim 5.

The pressure sensor unit 6 has sensors 8 mounted on a base cloth 7.

The base cloth 7 is formed of a rectangular unwoven cloth as viewed from top. On both sides in a width direction of the base cloth 7, a pair of additional cloths 9 are sewed so as to oppose each other so that a predetermined gap is formed equally in the center in the width direction.

More specifically, each of a pair of additional cloths 9 is sewed to the base cloth 7 through a sewing portion 10F on a front end portion thereof, a sewing portion 10RR on a rear end portion thereof, three sewing portions 11R (two lines composes a pair) extending from an edge portion opposing an edge of a mating cloth in the center in the width direction to the right in the width direction, and three sewing portions 11L (two lines composes a pair) extending from an edge portion opposing an edge of the mating cloth in the center in the width direction to the left in the width direction.

Three pocket portions PR, PL arranged in line are formed by three pairs of the sewing portions 11R, 11L formed in the width direction so that insertion mouths 12R, 12L are disposed to oppose each other. With such a structure, the pocket portions PR, PL can be formed only by sewing a pair of the additional cloths 9 to the base cloth 7 such that they overlap each other.

Three lateral branch portions 13R, 13L (totally 6) extending in a direction in which they departs from the branch portions on the other side are formed to be extended from the sensor 8. More specifically, three lateral branch portions 13R extend in parallel to each other in the width direction on the right side, while three lateral branch portions 13L extend in parallel to each other in the width direction on the left side. Corresponding portions of the lateral branch portions 13R, 13L correspond to each other across the center portion in the width direction.

The sensor 8 is mounted on the base cloth 7 by inserting the respective lateral branch portions 13R, 13L into corresponding pocket portions PR, PL.

The sensor 8 is so constructed that cells 15 for sensing a pressure and wiring 16 are incorporated in a film (PET) 14 which is a flexible supporting body. More specifically, three cells 15 are provided in each of the lateral branch portions 13R, 13L and ends of the wiring 16 are connected to a detector 17 for detecting a pressure.

Heater wire H is sewed on a top face of the base cloth 7 such that it does not overlap the sensor 8 on the same plane because it is deviated with respect thereto and it surrounds around the sensor 8 with an equal gap so that the shortest distance to the cell 15 is equal. Ends of the heater wire H are Joined to a connector 18, so that they are connected to a power source (not shown).

Next, a step for disposing the pressure sensor unit 6 on the surface of the seat face 2a of the seat cushion 2 will be described.

Figure 4:
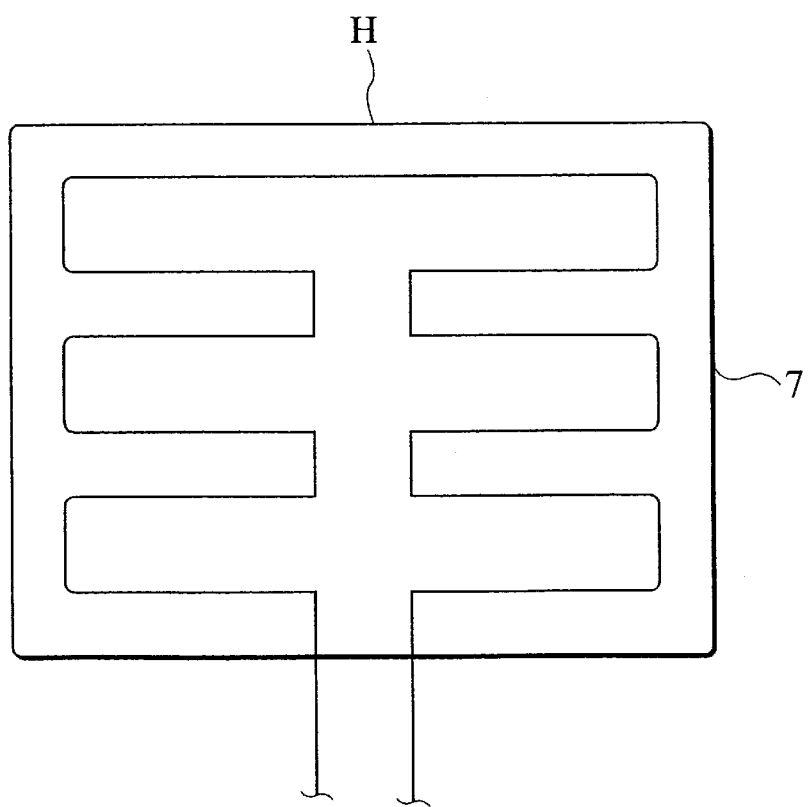
FIG. 4 is a plan view showing a base cloth on which heater wiring of the seat pressure sensor unit according to the embodiment is sewed.

First, as shown in FIG. 4, the heater wire H is disposed on the top face of the base cloth 7.

Figure 5:
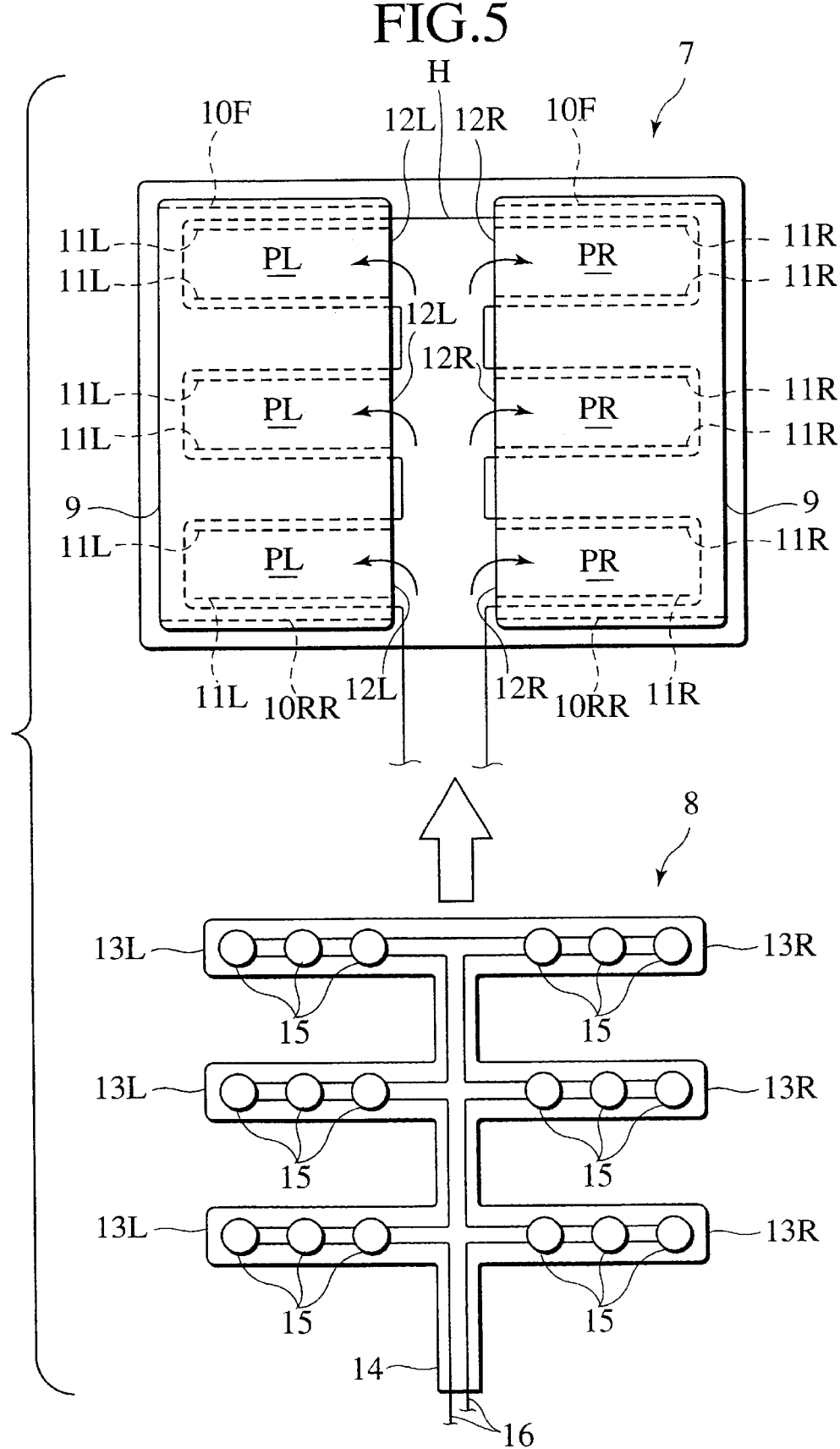
FIG. 5 is a plan view showing a state in which a sensor is mounted on the base cloth having pockets of the seat pressure sensor unit according to the embodiment.

Then, as shown in FIG. 5, the additional cloths 9 are sewed to the base cloth 7 by forming the sewing portions 10F, 10RR, 11R and 11L and the heater wire H is attached so that the pocket portions PR, PL are formed.

Then, as shown in FIG. 5, the respective lateral branch portions 13R, 13L of the sensor 8 are inserted into the corresponding pocket portions PR, PL so as to integrate the sensor 8 with the base cloth 7 thereby forming the pressure sensor unit 6.

The base cloth 7 of the pressure sensor unit 6 obtained in the above way is bonded to a top surface of the urethane pad 4 of the seat cushion 2 through double-sided adhesive tape (not shown).

As shown in FIGS. 2 to 3, a plurality of protrusions 4a for positioning are formed on the top surface of the urethane pad 4. By bonding the base cloth 7 along the protrusions 4a, positioning of the pressure sensor unit 6 on the seat cushion 2 is carried out favorably, so that the pressure sensor unit 6 is mounted on the seat cushion 2.

Further, positioning of the cells 15 of the sensor 8 with respect to the base cloth 7 is carried out favorably by inserting the lateral branch portions 13R, 13L into the corresponding pocket portions PR, PL.

Because the base cloth 7 is positioned on the seat cushion 2 accurately using the protrusions 4a, accuracy of positioning the cells 15 to the seat cushion 2 is increased so that an accurate pressure detection can be carried out.

In the pressure sensor unit 6 according to this embodiment, the heater wire H is disposed on the top surface of the base cloth 7 such that it is deviated not to overlap the sensor 8.

Therefore, a simple structure in which an influence of heat from the heater wire H upon the sensor 8 is small can be achieved while a necessity of providing an additional heat insulator or the like is eliminated.

Although such a structure in which the pressure sensor unit 6 is provided with the heater wire H is applied in the present invention, an influence of heat from the heater wire H upon the sensor 8 is suppressed and the pressure sensor unit 6 having such a simple, compact structure capable of exerting both the functions of the heater wire H and sensor 8 sufficiently can be realized.

Further, because the heater wire H is arranged at a position with an equal distance from the sensor 8, a surrounding temperature of the sensor 8 is equalized so that deviation of the sensitivity of the sensor 8 can be prevented thereby a high detection accuracy being achieved.

Further, because the heater wire H is meandered to surround the sensor 8, a large length of the heater wire H can be secured thereby raising warm-up effect of the heater wire H.

Further because installation of the sensor 8 can be carried out only by inserting the lateral branch portions 13R, 13L of the sensor 8 into the corresponding pocket portions PR, PL, the sensor 8 can be installed accurately and easily.

Further, because the respective insertion mouths 12R, 12L of the pocket portions PR, PL oppose each other, when the lateral branch portions 13R, 13L are inserted into the pocket portions PR, PL, they do not slip out easily so that the installation condition of the sensor 8 can be maintained securely. For example, even when the sensor 8 is pressed by a passenger's hip, the sensor 8 is prevented effectively from being slid largely.

Although the pocket portions PR, PL are formed by sewing two additional cloths 9 to the base cloth 7 according to this embodiment, the present invention is not restricted to this method. For example, it is permissible to overlay a cloth having substantially the same size on the base cloth 7, provide a pair of the sewing portions along the edge portion of each of the lateral branch portions 13R, 13L and make a cut-out portion on an end thereof as an insertion mouth.

Of course, the pressure sensor unit 6 can be disposed on not only the seat face 2a of the seat cushion 2 but also the backrest face 3a of the seat back 3 in the same way.

Next, a second embodiment of the present invention will be described.

A pressure sensor unit 23 of this embodiment is different from the first embodiment in that a structure for mounting the sensor 19 onto the base cloth 7 is changed and the other structure is the same. Like reference numerals are attached to the same components as the first embodiment and a description thereof is simplified.

Figure 6:
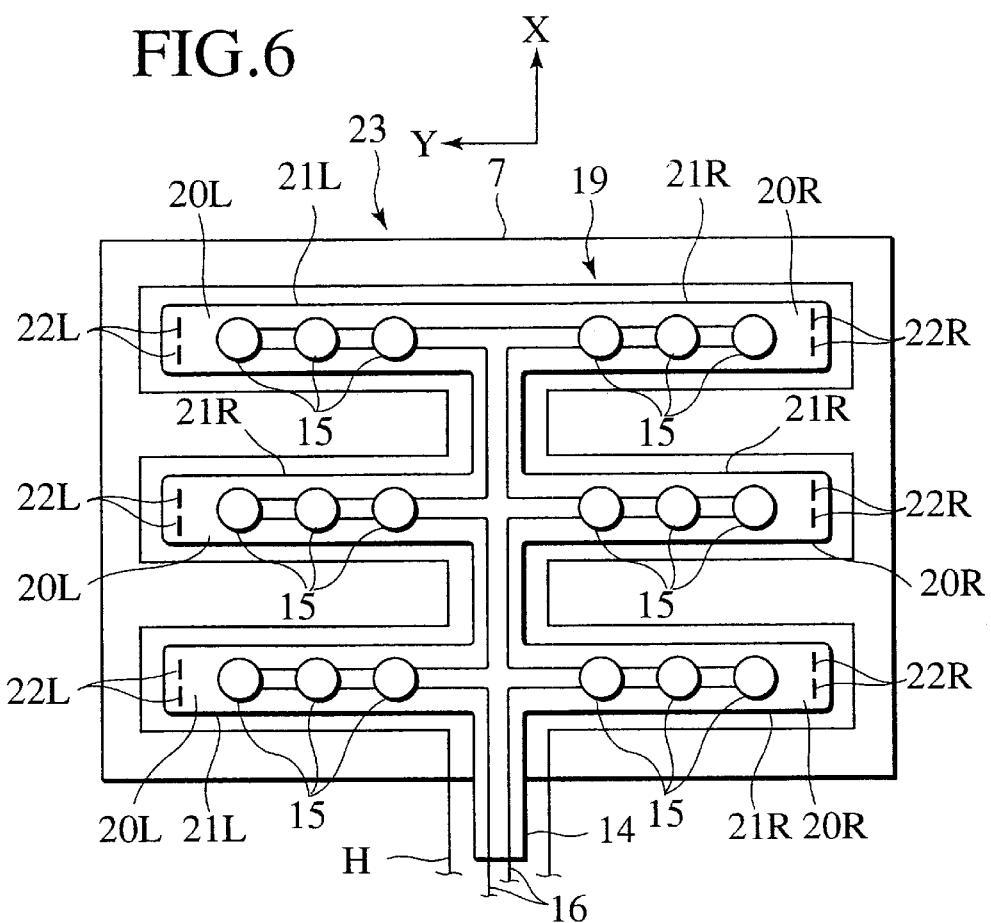
FIG. 6 is a plan view showing a seat pressure sensor unit according to a second embodiment of the present invention.

As shown in FIG. 6, the sensor 19 is mounted on the base cloth 7 using fixing portions 20R, 20L provided at end portions in the width direction of the sensor 19 by eliminating the pocket portions for use in the first embodiment.

That is, the fixing portions 20R, 20L extending from a film 14 are formed at each end portion of lateral branch portions 21R, 21L extending in the width direction of the sensor 19. The fixing portions 20R, 20L have sewing portions 22R, 22L. The sensor 19 is sewed to the base cloth 7 through the sewing portions 22R, 22L provided on the fixing portions 20R, 20L. The fixing portions 20R, 20L are not sensitive to pressure because they do not contain any cell 15 and therefore, even when the fixing portions are sewed to the base cloth 7 through the sewing portions 22R, 22L, the function of the sensor 19 is not affected.

In the pressure sensor unit 23 of this embodiment, a simple, compact structure in which the sensor 19 is hardly affected by a heat from the heater wire H can be achieved while the necessity of providing heat insulating material or the like additionally is eliminated.

Further, the pressure sensor unit 23 in which the structure of the base cloth 7 is simplified can be achieved by eliminating the necessity of forming the pocket portions while maintaining the function of the sensor 19 sufficiently.

Although sewing is carried out to mount the fixing portions 20R, 20L onto the base cloth 7 according to this embodiment, the present invention is not restricted to this method, however it is permissible to use a plane fastener, thermo-compression bonding by using adhesive agent or the like.

Although in the above case, the fixing portions 20R, 20L are formed at end portions of the lateral branch portions 21R, 21L, the fixing portions may be formed so as to protrude from halfway of the branch portions in the forward and backward direction of the seat cushion.

Next, a third embodiment of the present invention will be described below.

The pressure sensor unit 26 of this embodiment is different from the first embodiment in that instead of the lateral branch portions extending in the width direction, longitudinal branch portions 24R, 24M, 24L extending in the forward and backward direction are provided so as to form a substantially fork shaped sensor 25 and the other structure is the same. Like reference numerals are attached to the same component as the first embodiment and a description thereof is simplified.

Figure 7:
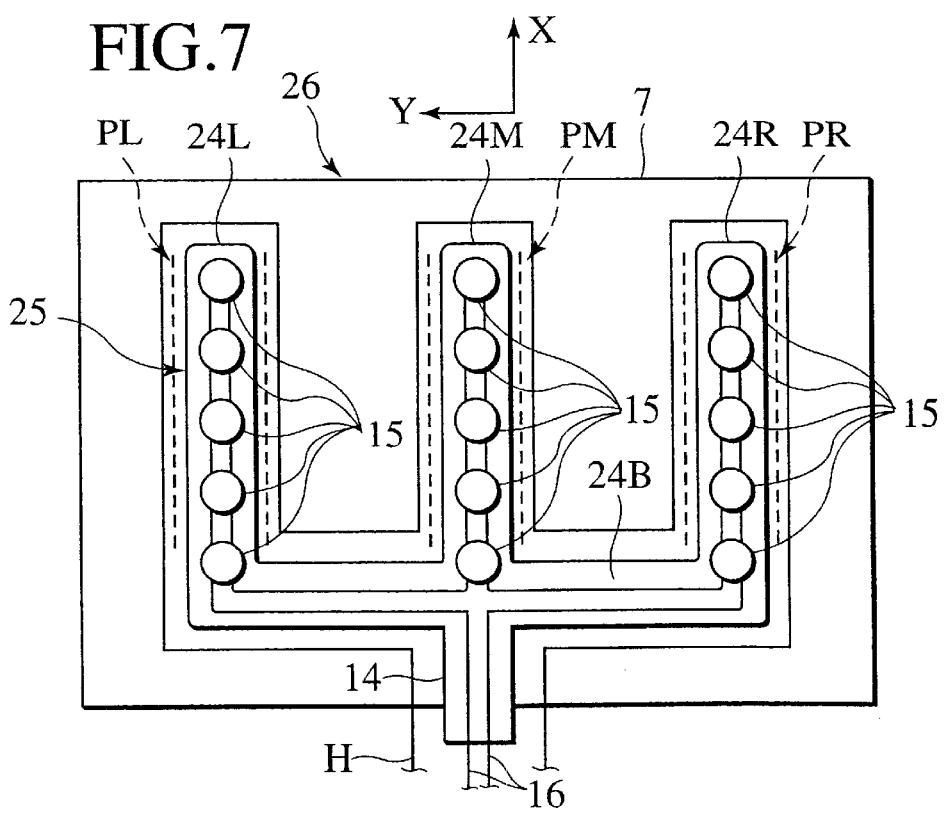
FIG. 7 is a plan view showing a seat pressure sensor unit according to a third embodiment of the present invention.

As shown in FIG. 7, the sensor 25 is formed of three longitudinal branch portions 24R, 24M, 24L extending vertically in parallel to each other from a proximal portion 24B provided in the width direction. More specifically, there are provided a longitudinal branch portion 24M extending forward from a center portion in the width direction of the proximal portion 24B, a longitudinal branch portion 24R extending forward from a right end portion in the width direction of the proximal portion 24B and a longitudinal branch portion 24L extending forward from a left end portion in the width direction of the proximal portion 24B.

The sensor 25 is attached to the base cloth 7 such that the respective longitudinal branch portions 24R, 24M, 24L are inserted into the corresponding pocket portions PR, PM, PL.

Then, the heater wire H is sewed on the top surface of the base cloth 7 such that it is deviated with respect to the sensor 25 on the same plane not so as to overlap the sensor 25 and it surround around the sensor 25 with an equal gap so that the shortest distance to the cell 15 is equal.

In the pressure sensor unit 26 of this embodiment, a simple, compact structure in which the sensor 25 is hardly affected by a heat from the heater wire H can be achieved while the necessity of providing a heat insulating material or the like additionally is eliminated.

In this embodiment also, of course, it is permissible to eliminate the pocket portions and mount the sensor 25 onto the base cloth 7 by forming the fixing portions on the longitudinal branch portions 24R, 24M, 24L.

Next, a fourth embodiment of the present invention will be described.

The pressure sensor unit 31 of this embodiment is different from the first embodiment in that the sensor 27 is attached to the base cloth 7 using a plurality of fixing portions 30F extending forward on a front end portion of the film 14 and a plurality of fixing portions 30R extending backward on a rear end portion of the film 14 such that lateral branch portions 28R, 28L are each arranged in parallel in the forward and backward direction to be connected to the film 14. The other structure is the same as the first embodiment. Like reference numerals are attached to the same components and a description thereof is simplified.

Figure 8:
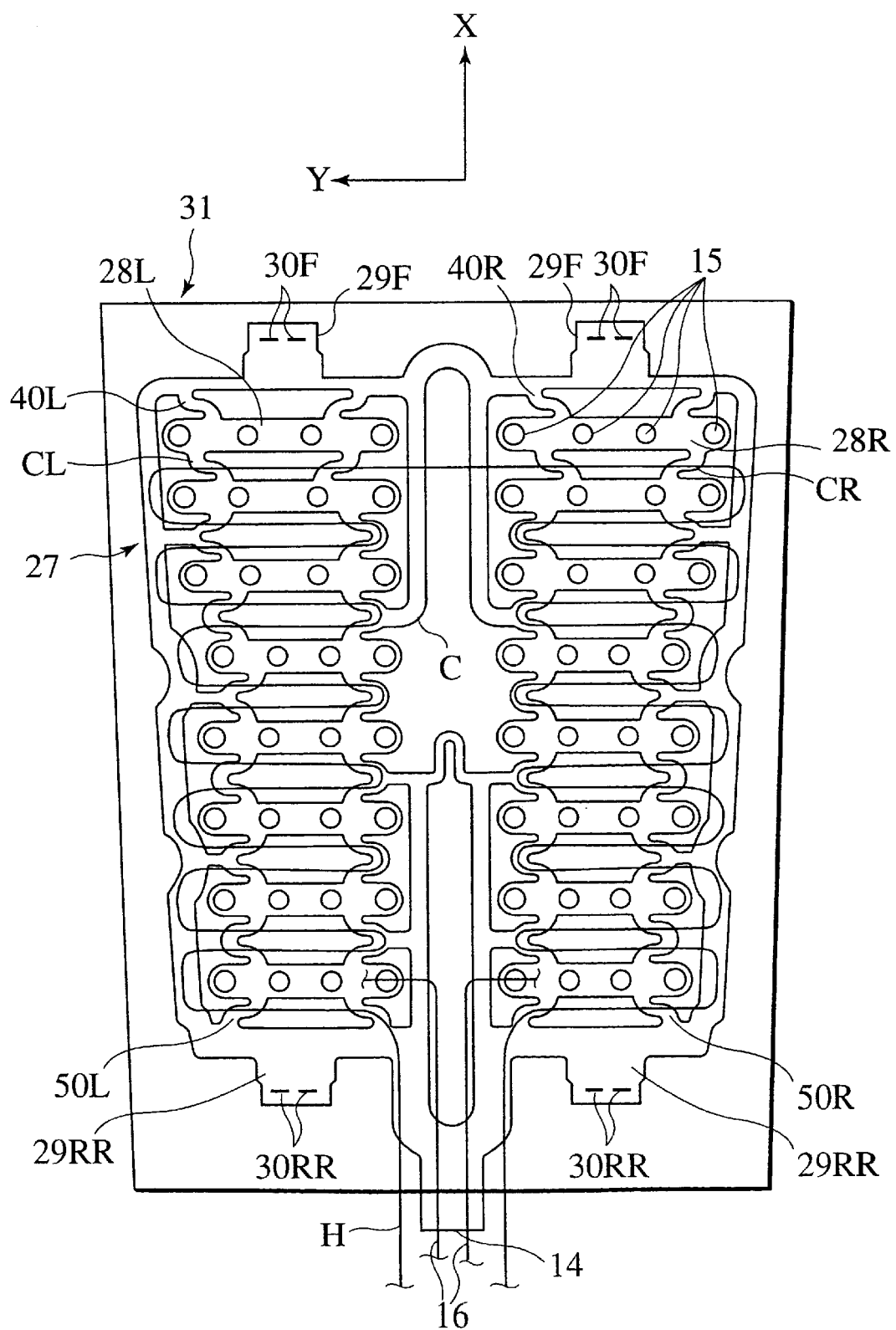
FIG. 8 is a plan view showing a seat pressure sensor unit according to a fourth embodiment of the present invention.

As shown in FIG. 8, the lateral branch portions 28R, 28L extending in the width direction and containing a plurality of the cells 15 are each arranged in parallel in the forward and backward direction to be connected such that a periphery of the lateral branch portions is surrounded by an outer peripheral portion of the film 14 and the lateral branch portions communicate with the outer peripheral portions of the film 14.

More specifically, the lateral branch portions 28R adjacent in the forward and backward direction communicate with each other through a pair of communicating portions CR, right and left in the forward and backward direction. The lateral branch portions 28L adjacent in the forward and backward direction communicate with each other through a pair of the communicating portions CL, right and left in the forward and backward direction. The communicating portions C communicate with the outer peripheral portion of the film 14 appropriately through several places.

The lateral branch portions located most forward communicate with the outer peripheral portion of the film 14 through a pair of forward communicating portions 40R, right and left. The lateral branch portions 28R located most backward communicate with the outer peripheral portion of the film 14 through a pair of backward communicating portions 50R, right and left. On the other hand, the lateral branch portions 28L located most forward communicate with the outer peripheral portion of the film 14 through a pair of forward communicating portions 40L, right and left. The lateral branch portion 28L located most backward communicate with the outer peripheral portion of the film 14 through a pair of backward communicating portions 50L, right and left.

Fixing portions 29F which are a pair of the longitudinal branch portions, right and left, extending forward are provided on a front end portion of the film 14 and sewing portions 30F are provided in each of the fixing portions 29F. On the other hand, fixing portions 29RR which are a pair of the longitudinal branch portions, right and left, extending backward are provided on a rear end portion of the film 14 and sewing portions 30RR are provided in each of the fixing portions 29RR.

The sensor 27 is sewed to the base cloth 7 through the sewing portions 30F, 30RR provided on the fixing portions 29F, 29RR. The fixing portions 29F, 29RR are not sensitive to pressure because they do not contain the cell 15. Thus, even when the fixing portions 29F, 29RR are sewed to the base cloth 7 through the sewing portions 30F, 30RR, the function of the sensor 27 is not affected.

Besides, the heater wire H is sewed on the top surface of the base cloth 7, such that it is deviated with respect to the sensor 27 on the same plane not so as to overlap the sensor 27 and it surround around the sensor 27 with a substantially equal gap while meandering with respect to the lateral branch portions 28R, 28L so that the shortest distance to the cell 15 is equal.

In the pressure sensor unit 26 of this embodiment, a simple, compact structure in which the sensor 25 is hardly affected by a heat from the heater wire H can be achieved while the necessity of providing a heat insulating material or the like additionally is eliminated.

Further, the pressure sensor unit 26 in which the structure of the base cloth 7 is simplified can be achieved while the necessity of forming the pocket portion is eliminated and a sufficient function of the sensor 27 is maintained.

Although sewing is carried out to mount the fixing portions 29F, 29RR onto the base cloth 7 according to this embodiment, the present invention is not restricted to this method, however it is permissible to use a plane fastener, thermo-compression bonding by using adhesive agent or the like.

Although in the above respective embodiments, a case in which the pressure sensor unit is applied to a vehicle seat has been described, it is needless to say that the present invention can be applied to seats other than vehicle seat or fixed seats indoor and outdoor. Further, it is needless to say that the present invention can be applied to a seat back as well as seat cushion.

The entire contents of a Patent Application No. TOKUGANHEI 11-137397 with a filing date of May 18, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A seat pressure sensor unit provided at a portion receiving a pressure of a seat, comprising:
   a sensor provided on a top face of-a base cloth; and
   a heater wire provided on the top face of the base cloth not so as to overlap the sensor.

2. A seat pressure sensor unit according to claim 1, wherein the heater wire is provided so as to have an equal distance from the sensor.

3. A seat pressure sensor unit according to claim 1, wherein the sensor has a lateral branch portion extending in a width direction of the seat or a longitudinal branch portion extending in a forward and backward direction of the seat and a pocket portion having an insertion mouth into which the lateral branch portion or the longitudinal branch portion is inserted so as to attach the sensor to the base cloth is further provided.

4. A seat pressure sensor unit according to claim 3, wherein the pocket portion is formed by overlaying an additional cloth on a portion corresponding to the lateral branch portion or the longitudinal branch portion of the base cloth and then sewing the additional cloth along both edge portions of the lateral branch portion or the longitudinal branch portion.

5. A seat pressure sensor unit according to claim 4, wherein a plurality of lateral branch portions extend in a direction in which the plurality of lateral branch portions depart from each other in the width direction of the seat, and pocket portions corresponding to the plurality of lateral branch portions are formed such that insertion mouths thereof oppose each other in the width direction.

6. A seat pressure sensor unit according to claim 2, wherein the sensor has a lateral branch portion extending in a width direction of the seat or a longitudinal branch portion extending in a forward and backward direction of the seat and a pocket portion having an insertion mouth into which the lateral branch portion or the longitudinal branch portion is inserted so as to attach the sensor to the base cloth is further provided.

7. A seat pressure sensor unit according to claim 6, wherein the pocket portion is formed by overlaying an additional cloth on a portion corresponding to the lateral branch portion or the longitudinal branch portion of the base cloth and then sewing the additional cloth along both edge portions of the lateral branch portion or the longitudinal branch portion.

8. A seat pressure sensor unit according to claim 7, wherein a plurality of lateral branch portions extend in a direction in which the plurality of lateral branch portions depart from each other in the width direction of the seat, and pocket portions corresponding to the plurality of lateral branch portions are formed such that insertion mouths thereof oppose each other in the width direction.

9. A seat pressure sensor unit according to claim 1, wherein the sensor has a lateral branch portion extending in a width direction of the seat or a longitudinal branch portion extending in a forward and backward direction of the seat, and a fixing portion capable of being attached to the base cloth is provided on a part of the lateral branch portion or the longitudinal branch portion.

10. A seat pressure sensor unit according to claim 9, wherein the sensor comprises cells and wiring installed on a flexible supporter, and the fixing portion is formed by extending a portion not including the cell and the wiring of the supporter.

11. A seat pressure sensor unit according to claim 2, wherein the sensor has a lateral branch portion extending in a width direction of the seat or a longitudinal branch portion extending in a forward and backward direction of the seat, and a fixing portion capable of being attached to the base cloth is provided on a part of the lateral branch portion or the longitudinal branch portion.

12. A seat pressure sensor unit according to claim 11, wherein the sensor comprises cells and wiring installed on a flexible supporter, and the fixing portion is formed by extending a portion not including the cell and the wiring of the supporter.

13. A seat pressure sensor unit provided at a portion receiving a pressure of a seat, comprising:
   a pressure detecting means provided on a top face of a base cloth; and
   a linear heating means provided on-the top face of the base cloth not so as to overlap the pressure detecting means.

* * * * *